(No Model.)
W. H. PETTIT.
Sleigh Brace.
No. 240,456.        Patented April 19, 1881.
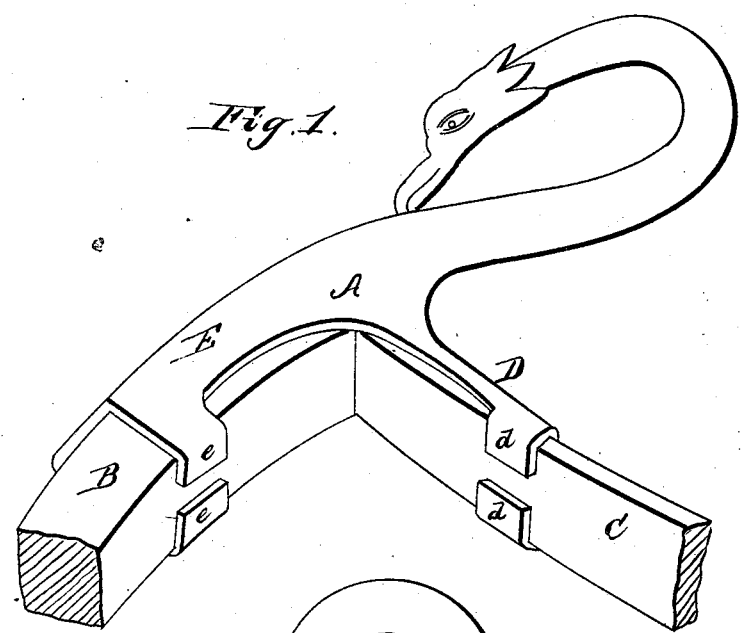
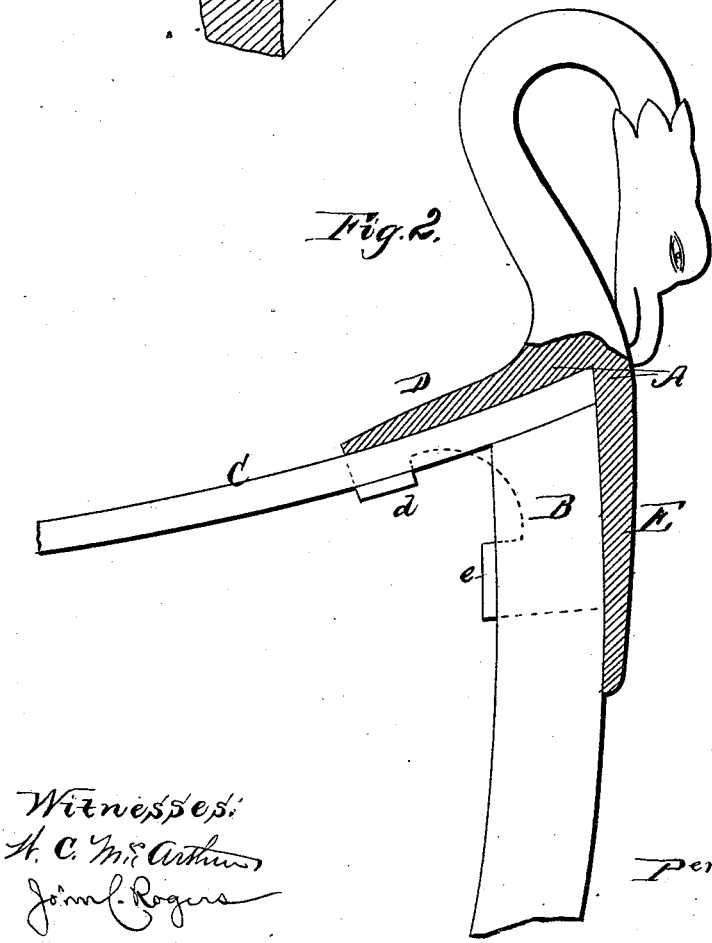
Witnesses:
H. C. McArthur
John C. Rogers
Inventor:
W. H. Pettit.
per
J. H. Alexander
Attorney.

UNITED STATES PATENT OFFICE.

WILLIAM H. PETTIT, OF GRAND RAPIDS, MICHIGAN.

SLEIGH-BRACE.

SPECIFICATION forming part of Letters Patent No. 240,456, dated April 19, 1881.

Application filed December 7, 1880. (No model.)

*To all whom it may concern:*

Be it known that I, WM. H. PETTIT, of Grand Rapids, in the county of Kent and State of Michigan, have invented certain new and useful Improvements in Sleigh-Braces; and I do hereby declare that the following is a full, clear, and exact description thereof, reference being had to the accompanying drawings, and to the letters of reference marked thereon, which form part of this specification.

The nature of my invention relates to fastenings for the runners and raves of sleighs; and it consists in a box or socket adapted to receive the points of runner and rave, and provided with a horizontal projection having wings for clasping the rave, and a downward projection having wings for clasping the runner, as will be hereinafter more fully set forth and claimed.

In order to enable others skilled in the art to which my invention appertains to make and use the same, I will now proceed to describe its construction, referring by letter to the annexed drawings, in which—

Figure 1 is a plan view, and Fig. 2 a sectional view.

A represents a box or socket which embraces the ends and sides of the sleigh-runner B and rave C, as seen in the drawings. This box or socket A is provided with a horizontal arm or projection, D, extending along the top of the rave C, and having wings $d\ d$, which are bent down to clasp and firmly hold the rave. The box is also provided with a downward projection, E, along the face of the runner, having wings $e\ e$ for clasping the runner.

I have represented the box as provided with the usual ornamental swan-neck.

It will be seen that this mode of securing the runner and rave makes a much stronger fastening than the old mode of screwing the rave on top of the runner. The rave was liable to be split, and the screw entering the end of the runner had very little hold. My device uses no screws whatever, makes a firm and easily-applied fastening, and braces the parts in all directions against strains. It is cheaper than the old mode, and of much better appearance.

Having thus fully described my invention, what I claim as new, and desire to secure by Letters Patent, is—

1. In a sleigh-brace, the socket A, for inclosing the ends and sides of the runner and rave, and formed with projection D, having wings $d\ d$, for bending against the same on its under side, all substantially as herein set forth.

2. In a sleigh-brace, the socket A, for inclosing the ends and sides of the runner and rave, and formed with downward projection E, said projection being provided with wings $e\ e$, for bending against the inner side of the runner, substantially as set forth.

3. The sleigh-brace herein described, consisting of a socket, A, inclosing the ends and three sides of the runner and rave, and the projections D and E, provided with wings $d\ d$ and $e\ e$, for inclosing the remaining sides of the raves and runner, substantially as and for the purpose set forth.

In testimony that I claim the foregoing as my own I affix my signature in presence of two witnesses.

WM. H. PETTIT.

Witnesses:
WM. M. ROBINSON,
HENRY J. FELKER.